Jan. 27, 1953     G. G. LAVERY     2,626,983
MAGNETIC TESTING APPARATUS
Filed March 6, 1951     2 SHEETS—SHEET 1
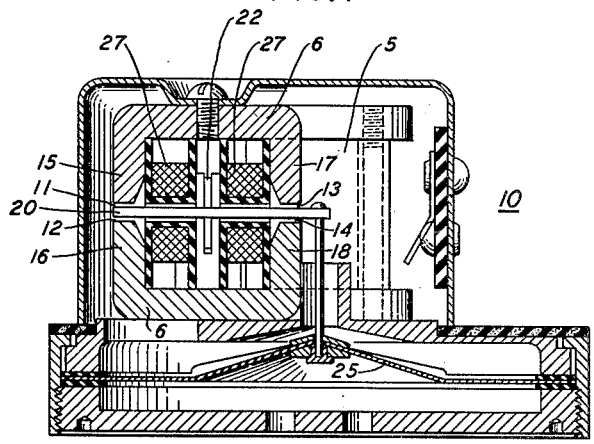
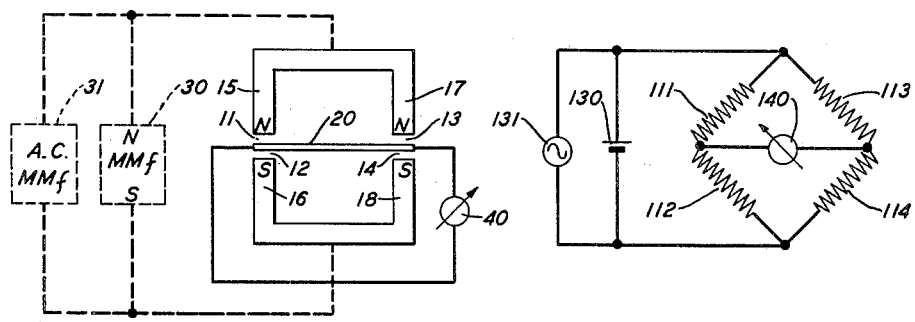
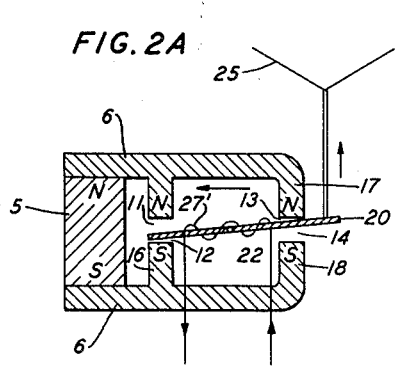
INVENTOR
G. G. LAVERY
BY
D. MacKenzie
AGENT Jan. 27, 1953     G. G. LAVERY     2,626,983
MAGNETIC TESTING APPARATUS
Filed March 6, 1951     2 SHEETS—SHEET 2
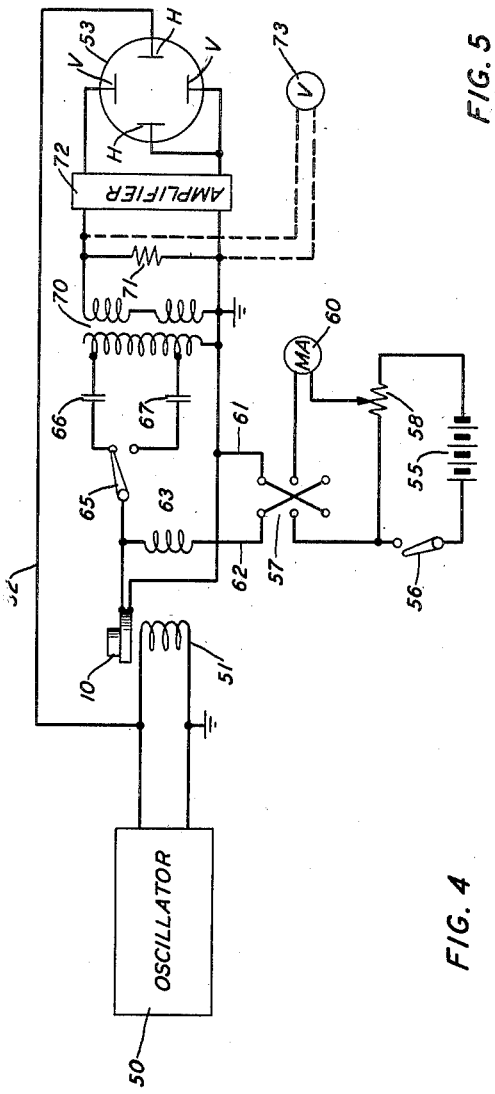
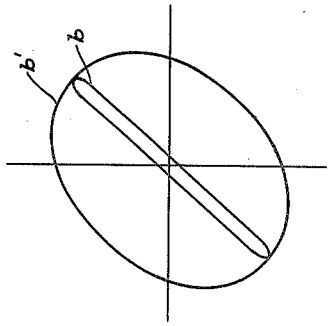
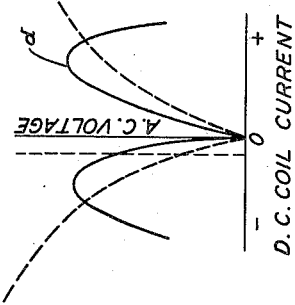
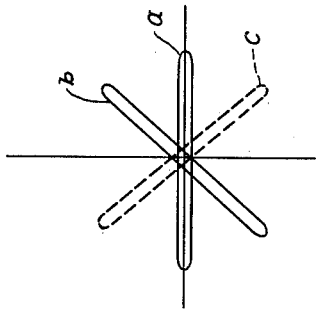
INVENTOR
G. G. LAVERY
BY
D. MacKenzie
AGENT Patented Jan. 27, 1953

2,626,983

UNITED STATES PATENT OFFICE 2,626,983

MAGNETIC TESTING APPARATUS

Grant G. Lavery, Summit, N. J., assignor to Bell Telephone Laboratories, Incorporated, New York, N. Y., a corporation of New York Application March 6, 1951, Serial No. 214,185

6 Claims. (Cl. 175—183)

This invention relates to a testing apparatus, useful generally in testing the magnetic symmetry of various types of apparatus and specifically important in positioning the balanced armature or balanced reed in magnetic structures such as sound power receivers or transmitters. Such instruments are used in telephone circuits including no source of direct current and convert sound waves into alternating electrical currents, or reversely, by the operation of an armature of magnetic material vibrating in the field of a permanent magnet.

A balanced armature sound power transducer of the class described is disclosed in United States Patent 2,267,808 granted December 30, 1941, to to N. Blount, "Electromagnetic Device." In such an instrument, the armature is at each end centered in an air-gap between two magnetic poles and at its center is pivoted for rotation about an axis perpendicular to the direction of the magnetic field in the air-gaps. At one end, the armature is connected in the conventional manner to drive a diaphragm in the case of a receiver or to be driven by a diaphragm in the case of a transmitter. A balanced reed structure is disclosed in my Patent 2,511,114, "Polarized Electromagnet," granted June 13, 1950.

It is desirable that the armature be magnetically centered in the magnetic circuit, that is, that its ends in the respective air-gaps be at the same magnetic potential, otherwise there will be excess magnetic flux in one or the other direction through the armature, with the obvious and harmful result of distorting the acoustical response of a receiver diaphragm to electrical currents in the driving coil about the armature or conversely the electrical response of a transmitter to sound waves incident on its diaphragm.

The present invention provides a system of apparatus and method of use thereof by which the magnetic location and operating characteristics of the armature may be readily determined.

An object of the invention is to enable the rapid and positive determination of the degree of accuracy with which a balanced armature or balanced reed is positioned in the air-gaps of a transducer.

Another object of the invention is to determine when the permanent magnet flux has been adjusted to obtain specified operating characteristics for the transducer, such as mechanical stability.

In the preparation of balanced armature transducers, it is customary to start with fully magnetized permanent magnets provided with pole pieces, as in the Blount patent above referred to, including air-gaps in which the armature is provisionally centered. In this condition, the armature may be unstable for the reason that the negative stiffness of the magnetic force upon the armature overbalances the positive stiffness of the mechanical suspension of the armature on its central pivot, and the armature may then either move erratically in the air-gaps or freeze to the pole tips. The magnetic structure is then progressively demagnetized until stability is reached, when the positive stiffness predominates.

A means of stabilizing the transducer and centering the armature is disclosed by C. L. Warren in United States Patent 2,534,565, December 19, 1950. In the procedure there disclosed, measurements are made of the efficiency of the transducer by measuring the impedance of the unit at various positions of the armature, that is, at various angles of rotation in either direction from the rest position which is nominally that of exact magnetic center. The voice coils surrounding the armature are simultaneously traversed by a signal current of desired frequency in the voice range, which produces vibration at that frequency of the armature about a mean position, and by a low frequency current which produces oscillation of the armature about the mean position of the latter when no coil current is present. The amplitude of the signal current is low relatively to that of the low frequency current and, of course, varies as the impedance of the unit at the signal frequency varies with armature position. A cathode-ray oscilloscope is then used to show on its screen the Lissajous figure corresponding to each amplitude to which the low frequency current is set.

In the Warren procedure, asymmetry of the patterns on the oscilloscope screen evidences the decentered rest position of the armature, and the extent of the patterns measures the variation in impedance of the unit with displacement of the armature from rest. The armature is then mechanically positioned at rest to the magnetic center and thereafter the magnet strength is reduced to reach the desired stability, which is evidenced by the desired uniformity in efficiency at various armature rotations from rest.

The present invention enables simpler adjustment procedures than those described in the above-noted patent to Warren and provides a more accurate method of measuring the transducer characteristics. The relative position of the armature in the air-gaps is indicated directly in terms of voltage as shown by an essentially linear trace on the screen of a cathode ray oscilloscope. The armature, and its trace, can be rotated in either direction relative to the rest position by means of superposed direct current in the armature coil. A horizontal trace indicates an armature magnetically balanced in the air-gaps and mechanical manipulation of the armature supports can readily attain this rest position. The direct current required to produce the maximum armature rotation, i. e., the maximum trace rotation, in either direction, is a function of the permanent magnet, or air-gap, flux, and hence is a criterion of the operation stability of the transducer.

The cathode ray oscilloscope trace is the result of two voltages of the same frequency. An alternating voltage of constant magnitude provides the horizontal component of the trace. The vertical component is obtained from a voltage induced in the armature coils and varies in phase and magnitude as the armature is displaced. To obtain this voltage, the transducer is mounted coaxially in a magnetic field provided by the above frequency source. When so located the air-gaps are parallel to this field, the armature is essentially perpendicular to the field, and so is the axis of the armature coils. The transverse alternating current flux through the armature, and hence the voltage induced in the armature coils, is a function of the armature displacement from its magnetic balance position.

An object of the invention is thus to provide a system of apparatus capable of exhibiting in a single trace on the screen of a cathode-ray oscilloscope the instantaneous position of the armature of a balanced armature transducer.

The air-gaps between the pole pieces of the permanent magnet of a transducer such as that of Blount Patent 2,267,808 are in parallel with reference to the magnet, and when a centrally supported ferromagnetic armature is positioned with its ends centered in the respective air-gaps, there results a magnetic bridge, the counterpart of a Wheatstone electrical bridge in the usual application. In the magnetic bridge, the permanent magnet signal frequency current, and resultant magnetic flux, is the counterpart of the battery; the armature, and its coils that of the galvanometer; and the two parts into which each air-gap is divided by the armature correspond to the four resistance arms of the Wheatstone bridge. A measurement of the magnetic flux lengthwise of the armature gives an indication of the symmetry of the armature's position relative to the pole piece faces.

A specific object of the invention, therefore, is to determine such symmetry by means of a cathode-ray oscilloscope circuit responsive to the balance of a magnetic bridge.

In acoustic transducers of the type discussed above, it is customary to insure, as by mechanical operations, that the north pole faces are coplanar and the south pole faces are also coplanar in a plane parallel to that of the opposing north poles, and that the armature between these planes is pivoted at a point in a plane equidistant from the two pole face planes and likewise equidistant in this central plane from the air-gaps near each end of the armature. The method of the invention permits at once an indication of the correct setting of the armature in a plane parallel to the pole faces and also indicates whether the pivot is itself properly located. This indication is important in all cases where a ferromagnetic element is to be best located for pivoting or centering between opposing magnetic poles.

Other objects and advantages of the invention will be recognized on reading the following description of a preferred embodiment, in which:

Fig. 1 is a sectional view of a balanced armature transducer to which the invention is applicable;

Fig. 2A is a simplified sectional view of the magnetic structure of the transducer of Fig. 1;

Fig. 2B is a schematic diagram of the magnetic bridge constituted by the pole tips and armature of the transducer of Fig. 2A, showing a source of alternating current magnetomotive force paralleling the permanent magnet;

Fig. 2C is a schematic of the electrical counterpart of the diagram of Fig. 2B;

Fig. 3 is a diagram of the apparatus used in testing the balance of a bridge exemplified by Fig. 2C;

Fig. 4 is a representation of the traces observed on the oscilloscope screen under various conditions of armature position in the unit under test by the apparatus of Fig. 3;

Fig. 5 is a representation of a normal trace and a trace resulting from improper choice of the stopping condensers of Fig. 3; and Fig. 6 shows curves of armature coil voltage versus armature displacement.

In all figures, like elements are designated by like numerals.

Referring first to Fig. 1, 10 designates a transducer shown in sectional side view identically as in Fig. 1 of Blount Patent 2,267,808 above mentioned, here reproduced to illustrate the application of the present invention. Of interest here are air-gaps 11, 12 between pole tips 15, 16 and air-gaps 13, 14 between corresponding pole tips 17, 18. Positioned nominally centrally in these air-gaps are the ends of armature 20 pivoted at its mid-point by a non-magnetic support 22. Armature 20 is mechanically connected to diaphragm 25, which it drives under control of current in coils 27 electromagnetically cooperating with permanent magnets such as 5, which provide flux across the air-gaps through members 6. For a full description of the transducer of Fig. 1, reference is made to the patent disclosure.

Fig. 2A is a simplified sectional view of the above transducer showing more clearly the interrelation of the several components.

Fig. 2B schematically represents the magnetic bridge of which the arms are air-gaps 11, 12 at one end and 13, 14 at the other end of armature 20. Pole tips 15 and 17 are both north poles, say, while tips 16 and 18 are south poles. The permanent magnet is symbolized by dotted rectangle 30. An auxiliary magnetic field of the test voltage frequency is indicated by the dotted rectangle 31. Assuming the same flux, north to south, at both ends of the armature, the latter will be traversed by no flux if its ends are at the same magnetic potential, that is, if the armature lies symmetrically in the fields of the gaps at left and right in the figure.

Fig. 2C is a Wheatstone bridge circuit, in which battery 130, alternating current, generator 131, resistances 111 through 114, and voltmeter 140 are analogous, respectively, to permanent magnet 30, source 31 of alternating current magnetomotive force, reluctances of gaps 11 through 14, and (hypothetical) fluxmeter 40 of Fig. 2B. The permanent magnet 30 may be disregarded in the bridge circuit analysis.

Displacement of the armature from its symmetrical position is schematically illustrated in Fig. 2A, where armature is shown rotated until its ends have almost struck against pole tips 16 and 17. In this situation, the maximum lengthwise flux traverses the armature, from right to left in the figure. The magnetic bridge is unbalanced, as if in Fig. 2C, voltmeter 140 were connected almost directly across the generator diagonal of the bridge. Of course, in Fig. 2A, an alternating field must be added to the permanent field in order that a corresponding voltage shall be induced in a winding 27' encircling the armature as do coils 27 of Fig. 1.

Fig. 3 is a circuit diagram of the apparatus which supplies the necessary alternating field and indicates the magnitude and phase of the voltage induced in coils 27 within unit 10. Oscillator 50 supplies constant frequency alternating current, conveniently of 400 cycles frequently, to coil 51 above which transducer 10 is coaxially placed. Depending on the position of armature 20 in unit 10, a voltage is induced in coils 27 varying in phase with the direction and in magnitude with the extent of the rotation of armature 20 from the symmetrical position. By way of conductor 52 and ground, the output voltage of oscillator 50 is impressed on the horizontal plates H of cathode-ray oscilloscope 53; the screen of which then shows a horizontal line in the absence of voltage on vertical plates V.

Rotation of armature 20 in unit 10 is effected by a direct current from battery 55, or equivalent source of continuous voltage, on closure of switch 56. The direction and magnitude of this current are controlled by reversing switch 57 and variable resistor 58, ammeter 60 reading the value of the current supplied via conductors 61 (grounded) and 62 from battery 55 to coils 27 in unit 10. Inductance coil 63 substantially excludes alternating current from the battery circuit and condenser 66 or 67 excludes direct current from the transformer 70. Via switch 65, the alternating voltage (if any) induced in the coils of unit 10, in superposition on the battery current therein, is supplied through either condenser 66 or 67 to a selectable fraction of the primary winding of transformer 70, and vertical plates V of oscilloscope 53 receive from the secondary winding a voltage proportional to that induced in coils 27, of frequency of that supplied by oscillator 50. Amplifier 72 may be required to obtain a satisfactory voltage on the vertical plates.

The capacitances of condensers 66 and 67 are selected as required to bring the voltage on the vertical plates V essentially in phase with the voltage on the horizontal plates H. Different coil impedances and transformer adjustments will require different condensers. The use of an improper size condenser results in an open type of oscilloscope trace, as shown by trace b' in Fig. 5, instead of the desirable line or closed figure shown by trace b. Since in some typical acoustic transducers of the type shown in Fig. 1, the coil impedance is 1024 ohms, while in others it is 64 ohms, switch 65 permits examination of either type of transducer without disturbing the circuit suitable for the other.

It is understood that oscilloscope 53 is provided with the customary spot focusing and centering controls, not shown. The centering control is adjusted to place the electron spot at the center of the screen when no voltage is applied to either set of plates. In that adjustment, an alternating voltage from oscillator 50 applied to the horizontal plates results in a trace centered vertically on the screen and symmetrical about the vertical axis thereof.

Now, if switch 57 is closed in one direction, say upward, the armature will rotate in the corresponding direction, and a greater voltage will appear in the armature coils to be transferred to plates V of the oscilloscope. The resulting oscilloscope trace will be rotated to appear as trace b, Fig. 4. Reversing switch 57, the oscilloscope screen will show trace c. The extent of the armature rotation, and hence of the trace rotation, will increase, within limits, as the direct current, indicated by ammeter 60, increases.

If the rotations, clockwise and counterclockwise, of armature 20 for a given direct current are equal, traces b and c will make equal but opposite angles with trace a. Lack of such equality, of course, indicates a dissymmetry in the armature motion about its rest, or zero current position, here understood to be the position of magnetic balance, or horizontal trace pattern. Mechanical intervention to bend the pivot plate 22 in Fig. 1 is used to attain this rest position, after the air-gap flux as provided by magnet 5, Fig. 2A, has been partially adjusted, as later explained.

The secondary winding of transformer 70 is closed by a load resistance 71, transformer 70 being chosen to match the impedance of the unit and the oscilloscope input circuit. An amplifier 72 is used as needed between resistance 71 and oscilloscope 53; and, if desired, voltmeter 73 may be connected across resistance 71. The voltmeter reading versus direct current increment may be used to plot the armature motions in place of the oscilloscope trace pattern. The corresponding plot will appear as shown in Fig. 6.

If the direct current through coils 27 is continuously increased, the trace b is found to rotate through a maximum angle and thereafter the rotation decreases, corresponding at the maximum to approaching magnetic saturation of the armature. By changing the flux of the permanent magnet, and hence the air-gap flux density, the maximum angle of armature rotation and the corresponding direct current required to realize this maximum can be varied. Dissymmetry in armature rotations may be due to magnetic dissymmetry in the pole pieces 6 or to mechanical interference with the free motion of the armature in the air-gaps. Further, if the armature, though in a plane where the magnetic bridge is balanced, is not pivoted about a point geometrically centered, the maximum rotation trace is likely to be distorted in one extreme portion by reason of one end of the armature striking against a pole face. Rotations within this limit suffice to show how nearly the pivot about which the armature turns is geometrically centered between the two planes of the pole pieces 6. The correction of the pivot is by mechanical intervention.

In practicing the invention, unit 10 is placed in a recess in the upper holding ring of the mounting of coil 51, the oscillator output is made of desired frequency and of amplitude suited to the diameter of the oscilloscope screen, and the trace a on the screen is observed with no direct current in the armature coils.

The direct current is then supplied to the armature coils, and varied from a low value to a value corresponding to the maximum rotation of trace in each direction. If the direct current for maximum rotation in one sense is greater than in the other sense, the armature motion is nonsymmetrical and may indicate mechanical interference. If the trace for maximum rotation on either side of the rest position of the armature is distorted, the pivot is mechanically readjusted.

Finally, if the direct currents required for maximum rotation in each direction are equal but are less than those specified by considerations based on the intended use of the transducer, the magnets of the unit are demagnetized to a suitable value. If the direct currents required for maximum rotation are greater than those specified, the air-gap flux must be increased by remagnetizing the permanent magnet.

If corresponding readings of voltmeter 73 and ammeter 60 are made for both positions of switch 57, there may be plotted the curves of Fig. 6, giving additional information not readily apparent from the oscilloscope traces of Fig. 4. In Fig. 6, the direct currents in coils 27 are plotted horizontally against the corresponding readings of voltmeter 73 plotted vertically.

If the armature is magnetically balanced, minimum voltage is shown by voltmeter 73 for zero coil current. As the coil current is increased to rotate the armature in either sense, the 400 cycle voltage induced in the coils rises to a maximum and then decreases, as shown by curve $d$. Saturation of the armature corresponds to the peaks of curve $d$, and from a knowledge of the required sensitivity of the instrument, the permanent magnet may be suitably demagnetized, by known methods, until the peaks of curve $d$ are made to occur at the desired values of aiding and opposing direct current in coils 27. Complete demagnetization of the permanent magnet results in curve $e$, in which condition direct current in coils 27 produces no armature rotation and such rotation must be brought about mechanically and no saturation is shown. If the armature is not magnetically centered, the minimum voltage will appear at a value of direct current other than zero and the curves $d$ and $e$ will be symmetrical about a vertical line, such as that dashed in Fig. 6.

The invention, here described in a particular application, is of use in the study of magnetic circuits generally. The alternating voltage induced in coils 27 is of course an indication of the extent of armature displacement, so that measurement is possible of motions of the armature however caused. A mechanical force displacing the armature from an initially centered position may be measured by the current from battery 55 required to restore the balance.

What is claimed is:

1. Apparatus for testing the magnetic centering of an armature in the air-gap of a magnetic circuit provided with a signal coil encompassing the armature, comprising means for establishing an alternating magnetic field normal to the axis of the coil, means for reversibly and variably rotating the armature relatively to the magnetic circuit, and means electrically coupled to the coil for indicating the direction and magnitude of the alternating voltage induced in the coil consequent upon the rotation of the armature.

2. Apparatus for testing the magnetic centering of the armature of a transducer of the balanced armature type, said transducer being provided with a magnetic circuit including two parallel air-gaps in which the ends of the armature are positioned and with a coil encompassing the armature, comprising means for establishing an alternating magnetic field, concentric with the transducer and normal to the axis of the coil, means for reversibly and variably supplying a direct current to the coil, thereby affecting corresponding rotation of the armature relatively to the air-gaps, and means for indicating the direction and extent of the rotation of the armature in either sense of rotation.

3. Apparatus as in claim 2 in which the indicating means includes a cathode-ray oscilloscope on the horizontal plates of which is impressed an alternating voltage corresponding to the established field, while the alternating voltage induced in the signal coil consequent on the armature rotation is impressed on the vertical plates of the oscilloscope.

4. Apparatus for testing the magnetic centering of an armature extending at each end into an air-gap between magnetic poles of opposite polarity and rotatable about an axis intermediate the gaps, the magnetic fields in the gaps being alike in direction normal to the axis and parallel to the plane of a signal coil encompassing the armature, comprising means for establishing an alternating magnetic field concentric with the air-gaps and parallel to the plane of the coil, means for supplying to the coil a reversible and variable direct current, thereby to effect corresponding rotation of the armature about the axis, and means for indicating the extent and direction of the rotation.

5. Apparatus as in claim 4, in which the indicating means includes a cathode-ray oscilloscope on the screen of which a trace represents in one direction the established field and at right angles thereto the alternating voltage induced in the coil consequent upon the rotation of the armature.

6. A magnetic bridge comprising a magnetic circuit including a permanent magnet and a pair of parallel air-gaps, an armature extending at its ends into one and into another of the gaps and pivoted for rotation about an axis intermediate the gaps and normal thereto, a coil coaxial with the armature, electrical means for rotating the armature about the axis including a source of variable direct current in series with the coil, means for establishing an alternating magnetic field aligned with the magnet and means for indicating the alternating voltage induced in the coil on rotation of the armature.

GRANT G. LAVERY.

REFERENCES CITED

The following references are of record in the file of this patent:

UNITED STATES PATENTS

| Number | Name | Date |
| --- | --- | --- |
| 2,423,970 | Gardner | July 15, 1947 |
| 2,534,565 | Warren | Dec. 19, 1950 |